(12) United States Patent
Mandel et al.

(10) Patent No.: US 11,704,628 B2
(45) Date of Patent: Jul. 18, 2023

(54) PRESENTATION AND SORTING OF GENERAL DATA

(71) Applicant: Bitvore Corp., Los Angeles, CA (US)

(72) Inventors: Carl Mandel, Toronto (CA); David Mandel, Los Angeles, CA (US)

(73) Assignee: Bitvore Corp., Los Angeles, CA (US)

( * ) Notice: Subject to any disclaimer, the term of this patent is extended or adjusted under 35 U.S.C. 154(b) by 452 days.

(21) Appl. No.: 15/679,410

(22) Filed: Aug. 17, 2017

(65) Prior Publication Data
US 2018/0096304 A1   Apr. 5, 2018

Related U.S. Application Data

(63) Continuation of application No. 12/836,446, filed on Jul. 14, 2010, now Pat. No. 9,767,438.

(60) Provisional application No. 61/262,456, filed on Nov. 18, 2009, provisional application No. 61/225,536, filed on Jul. 14, 2009.

(51) Int. Cl.
*G06Q 10/107* (2023.01)
(52) U.S. Cl.
CPC ................. *G06Q 10/107* (2013.01)
(58) Field of Classification Search
CPC ................................... G06Q 10/107
See application file for complete search history.

(56) References Cited

U.S. PATENT DOCUMENTS

| | | | | |
|---|---|---|---|---|
| 8,418,083 B1 * | 4/2013 | Lundy | ............... | G06F 3/0487 715/810 |
| 9,767,438 B2 | 9/2017 | Mandel et al. | | |
| 2005/0004990 A1 | 1/2005 | Durazo et al. | | |
| 2005/0160372 A1 | 7/2005 | Gruen et al. | | |
| 2006/0173824 A1 | 8/2006 | Bensky et al. | | |
| 2006/0188084 A1 | 8/2006 | Rogers et al. | | |
| 2006/0200764 A1 | 9/2006 | Sellers et al. | | |
| 2006/0242121 A1 | 10/2006 | DeVorchik et al. | | |
| 2008/0141145 A1 * | 6/2008 | Klausmeier | ............... | G06Q 10/109 715/751 |
| 2009/0100009 A1 * | 4/2009 | Karp | ............... | G06Q 10/107 |
| 2009/0319911 A1 * | 12/2009 | McCann | ............... | G06Q 10/107 715/752 |
| 2009/0327972 A1 * | 12/2009 | McCann | ............... | G06Q 10/107 715/853 |
| 2010/0262925 A1 * | 10/2010 | Liu | ............... | G06Q 10/10 715/759 |
| 2011/0265036 A1 | 10/2011 | Hoehne | | |

\* cited by examiner

*Primary Examiner* — Jennifer N Welch
*Assistant Examiner* — Ashley M Fortino
(74) *Attorney, Agent, or Firm* — McAndrews, Held & Malloy, Ltd.

(57) ABSTRACT

The system provides a method and process for displaying and sorting messages in a communication system. The system allows multiple folders of messages to be opened simultaneously. The system also displays sent and received messages in the same display when desired. The system includes automatic and/or custom color coding of messages for ease of identification of message types, sent or received messages, root sender, cc messages, responsive messages, etc. The system also includes a unique navigation system to allow the user to more easily move through related messages, threads, and folders. The navigation system can be used in situations where the prior art would have required a search to be executed.

20 Claims, 11 Drawing Sheets

FROM 1A

101D — Cooper's Classmates — 03/03/2009 — 3

SENT Emails — 03/03/2009

101E — Investment Info/Reports — 10/03/2009

| | | |
|---|---|---|
| gwen@xcompany.com | Lost Mutual Funds | 01/01/2009 |
| davidm@aolco.com | Payment for Invoice | 01/01/2009 |
| judy@rogers.com | Trip to Florida/US ... | 01/01/2009 |

104
To: cmandel@e-company.ca
Cc: Teresa, Greg K.

Carl,
Curabitur vulputate felis a velit lobortis mollis. Suspendisse convallis facilisis eros id condimentum. Praesent vitae enim, dui quis consectetur ornare, mauris lorem hendrerit orci, non eleifend nibh ante a est. Sed ultricies justo eget purus ornare quis lacinia lorem sollicitudin.

Vestibulum ullamcorper, massa sit amet laoreet eleifend, orci magna euismod lectus, a tempus lorem arcu vitae odio. Cras at congue risus. Fusce auctor justo ut lorem commodo suscipit. Proin in lectus felis. Proin quis lorem nibh, a tempus lorem arcu vitae odio.

(Reply) (Reply All) (Forward)     (Move to...)

| | | |
|---|---|---|
| johnh@lwyers.com | Litigation Case & US .... | 02/12/2009 |
| davidm@aolco.com | Payment for invoice | 01/01/2009 |
| judy@rogers.com | Trip to Florida/US ... | 01/01/2009 |
| johnh@lwyers.com | Litigation Case & US rules | 02/12/2009 |
| davidm@aolco.com | Payment for Invoice | 01/01/2009 |
| judy@rogers.com | Trip to Florida/US funds | 01/01/2009 |
| = johnh@lwyers.com | Litigation Case & US ... | 02/12/2009 |

101F — Friends and Family — 07/03/2009 — 1

101G — General (unfiltered) Mailbox — 34 mins ago — 34

FIGURE 1B

| | | |
|---|---|---|
| Legal Issues | | 01/03/2009  4 |
| Business Emails | | 1 hr ago  8 |

| From | Subject | Received |
|---|---|---|
| gwen@xcompany.ca | Lost Mutual Funds | Feb/12/09 10am |

208 —

Send | To | Save as Draft | Attachment

To: gwen@xcompany.com, davidm@aolco.com, judy@rogers.com

Cc: john@lwyers.com, ohnh@lwyers.com, teresa@xzco.com, johnh@lwyers.com

Bcc: Reza@ABCo.com

To: gw...
Cc: jo...

Gwen,
Lorem ... nec arcu
risus. N... rmentum
bibend... sim eu id
augue.

103 —

To: cmandel@e-company.ca       Feb/12/09 10:45
Cc: Teresa, Greg K.

Carl,
Curabitur vulputate felis a velit lobortis mollis. Suspendisse convallis facilisis eros id condimentum. Praesent vitae enim, dui quis consectetur ornare, mauris lorem hendrerit orci, non eleifend nibh ante a est. Sed ultricies justo eget purus ornare quis lacinia lorem sollicitudin.

Make sure you include the organizational charts

Vestibulum ullamcorper, massa sit amet laoreet eleifend, orci magna euismod lectus, a tempus lorem arcu vitae odio. Cras at congue risus. Fusce auctor justo ut lorem commodo suscipit. Proin in lectus felis. Proin quis lorem nibh. a tempus lorem arcu vitae odio.

| From | Subject | Received |
|---|---|---|
| davidm@aolco.com | Payment for Invoice | 01/01/2009 |
| judy@rogers.com | Trip to Florida/US ... | 01/01/2009 |
| johnh@lwyers.com | Litigation Case & US .... | 02/12/2009 |
| davidm@aolco.com | Payment for Invoice | 01/01/2009 |
| judy@rogers.com | Trip to Florida/US funds | 01/01/2009 |
| johnh@lwyers.com | Litigation Case & US .... | 02/12/2009 |
| davidm@aolco.com | Payment for Invoice | 01/01/2009 |

| | | | |
|---|---|---|---|
| Legal Issues | | 01/03/2009 | 4 |
| Business Emails | | 1 hr ago | 8 |

| From | Subject | Received |
|---|---|---|
| gwen@xcompany.ca | Lost Mutual Funds | Feb/12/09 10am |

(Send) (To)    (Save as Draft) (Attachment)

To: gwen@xcompany.com, davidm@aolco.com, judy@rogers.com
Cc: john@lwyers.com, teresa@xzco.com, johnh@lwyers.com Gwen,
Lorem ipsum dolor sit amet, consectetur adipiscing elit. Curabitur nec arcu risus. Maecenas cursus pulvinar metus vitae lacinia. Maecenas fermentum bibendum ultrices. Quisque sit amet elit quis ante placerat dignissim eu id augue.

To: cmandel@e-company.ca                  Feb/12/09 10:45
Cc: Teresa, Greg K.

Carl,
Curabitur vulputate felis a velit lobortis mollis. Suspendisse convallis facilisis eros id condimentum. Praesent vitae enim, dui quis consectetur ornare, mauris lorem hendrerit orci, non eleifend nibh ante a est. Sed ultricies justo eget purus ornare quis lacinia lorem sollicitudin.

Make sure you include the organizational charts

Vestibulum ullamcorper, massa sit amet laoreet eleifend, orci magna euismod lectus, a tempus lorem arcu vitae odio. Cras at congue risus. Fusce auctor justo ut lorem commodo suscipit. Proin in lectus felis. Proin quis lorem nibh. a tempus lorem arcu vitae odio.

| From | Subject | Received |
|---|---|---|
| davidm@aolco.com | Payment for invoice | 01/01/2009 |
| judy@rogers.com | Trip to Florida/US ... | 01/01/2009 |
| johnh@lwyers.com | Litigation Case & US .... | 02/12/2009 |
| davidm@aolco.com | Payment for invoice | 01/01/2009 |
| judy@rogers.com | Trip to Florida/US funds | 01/01/2009 |
| johnh@lwyers.com | Litigation Case & US .... | 02/12/2009 |
| davidm@aolco.com | Payment for invoice | 01/01/2009 |
| judy@rogers.com | Trip to Florida/US ... | 01/01/2009 |
| johnh@lwyers.com | Litigation Case & US rules | 02/12/2009 |
| davidm@aolco.com | Payment for invoice | 01/01/2009 |
| judy@rogers.com | Trip to Florida/US funds | 01/01/2009 |
| johnh@lwyers.com | Litigation Case & US .... | 02/12/2009 |

| Banking/Investment Contacts | 2.5 hrs ago | 12 |

FIGURE 4

| Legal Issues | 01/03/2009 | 4 |

| Business Emails | 1 hr ago | 8 |

| From | Subject | Received |
|---|---|---|
| gwen@xcompany.ca | Lost Mutual Funds | Feb/12/09 10am |

Send | To | Save as Draft | Attachment

To:   gwen@xcompany.com, davidm@aolco.com, judy@rogers.com

Cc:   john@lwyers.com, ohnh@lwyers.com, teresa@xzco.com, johnh@lwyers.com

Bcc:  Reza@ABCo.com

Gwen,
Lorem ... nec arcu risus. ... rmentum bibend... ...im eu id augue.

To: cmandel@e-company.ca   Feb/12/09 10:45
Cc: Teresa, Greg K.

Carl,
Curabitur vulputate felis a velit lobortis mollis. Suspendisse convallis facilisis eros id condimentum. Praesent vitae enim, dui quis consectetur ornare, mauris lorem hendrerit orci, non eleifend nibh ante a est. Sed ultricies justo eget purus ornare quis lacinia lorem sollicitudin.

Make sure you include the organizational charts

Vestibulum ullamcorper, massa sit amet laoreet eleifend, orci magna euismod lectus, a tempus lorem arcu vitae odio. Cras at congue risus. Fusce auctor justo ut lorem commodo suscipit. Proin in lectus felis. Proin quis lorem nibh, a tempus lorem arcu vitae odio.

| davidm@aolco.com | Payment for invoice | 01/01/2009 |
| judy@rogers.com | Trip to Florida/US ... | 01/01/2009 |
| johnh@lwyers.com | Litigation Case & US .... | 02/12/2009 |
| davidm@aolco.com | Payment for invoice | 01/01/2009 |
| judy@rogers.com | Trip to Florida/US funds | 01/01/2009 |
| johnh@lwyers.com | Litigation Case & US .... | 02/12/2009 |
| davidm@aolco.com | Payment for invoice | 01/01/2009 |
| judy@rogers.com | Trip to Florida/US ... | 01/01/2009 |
| johnh@lwyers.com | Litigation Case & US rules | 02/12/2009 |
| davidm@aolco.com | Payment for invoice | 01/01/2009 |
| judy@rogers.com | Trip to Florida/US funds | 01/01/2009 |
| ohnh@lwyers.com | Litigation Case & US .... | 02/12/2009 |

| Banking/Investment Contacts | 2.5 hrs ago | 12 |

FIGURE 5

PRESENTATION AND SORTING OF GENERAL DATA

This patent application claims priority to U.S. Provisional Patent Application No. 61/225,536 filed on Jul. 14, 2009 and to U.S. Provisional Patent Application No. 61/262,456 filed on Nov. 13, 2009, both of which are incorporated by reference herein in their entireties.

BACKGROUND OF THE SYSTEM

Field of the Invention

The invention relates generally to a system of sorting and presenting email.

BACKGROUND OF THE INVENTION

There are a number of email applications used for sending and receiving email. Examples include email clients such as Microsoft Outlook, Eudora, Mozilla Thunderbird, and GnuMail, and browser based email systems such as YahooMail and GoogleMail. Regardless of the system, prior art email clients have a number of disadvantages.

One disadvantage of prior art email systems is the limitation in presentation and sorting of email messages. Many systems allow a user to establish rules to sort incoming messages into folders automatically. In Outlook, for example, there is a rules wizard for defining conditions for incoming and outgoing email messages to be automatically placed into specific folders. Messages can also be color coded using the rules wizard so that certain to or from messages will be in a selected color.

A disadvantage of the sorting rules and system used by Outlook and other email systems is the limited visibility of message folders or defined groups of emails. There is also an inability to clearly display and message threads that contain both received and sent messages. In Outlook, there are separate folders for sent messages and for received messages. It is possible to look at a thread (as long as it contains the same subject line) of all sent messages, or all received messages (again, only if it has the same subject line) but not to see both sent and received in the same view.

Another disadvantage is that only one folder can be viewed at one time. The system includes a viewing pane that displays all the messages from a folder. In addition, the folder is displayed in a different region of the display from the messages themselves. Without double checking, it is easy to forget which folder is being accessed at any one time. There are also times when it would be useful to have two or more folders opened at the same time. However, prior art systems lack that capability.

In addition, it is often difficult to follow email threads and strings in prior art systems without executing a search. This has the disadvantage of putting the email system in a search mode where normal functions are not accessible without interrupting the search. In addition, the search is not saved so that it is not possible to toggle back and forth between two searches or between a search and the normal view of the email system. The need for searches slows down operability and limits functionality.

BRIEF SUMMARY OF THE SYSTEM

The system provides a method and process for displaying and sorting messages in a communication system. The system allows multiple folders of messages to be opened simultaneously. The system also displays sent and received messages in the same display when desired. The system includes automatic and/or custom color coding of messages for ease of identification of message types, sent or received messages, root sender, cc messages, responsive messages, etc. The system also includes a unique navigation system to allow the user to more easily move through related messages, threads, and folders. The navigation system can be used in situations where the prior art would have required a search to be executed. The system is not limited to email but may be used for any type of communications, including, but not limited to, bulletin board messages, SMS messages, Twitter messages, social network communications and other communications. In addition, the system allows for the inclusion of transactional information, including financial transactions, physical movement, asset deployment, or other acts or activities that may be related to, or independent of, the communications.

BRIEF DESCRIPTION OF THE DRAWINGS

FIGS. 1A and 1B are a first view of an inbox configuration in one embodiment of the system.

FIGS. 2A and 2B are a second view of an inbox configuration in one embodiment of the system.

FIG. 3 is a third view of an inbox configuration in one embodiment of the system.

FIG. 4 is a fourth view of an inbox configuration in one embodiment of the system.

FIG. 5 is a fifth view of an inbox configuration in one embodiment of the system.

DETAILED DESCRIPTION OF THE SYSTEM

Figure 1A:
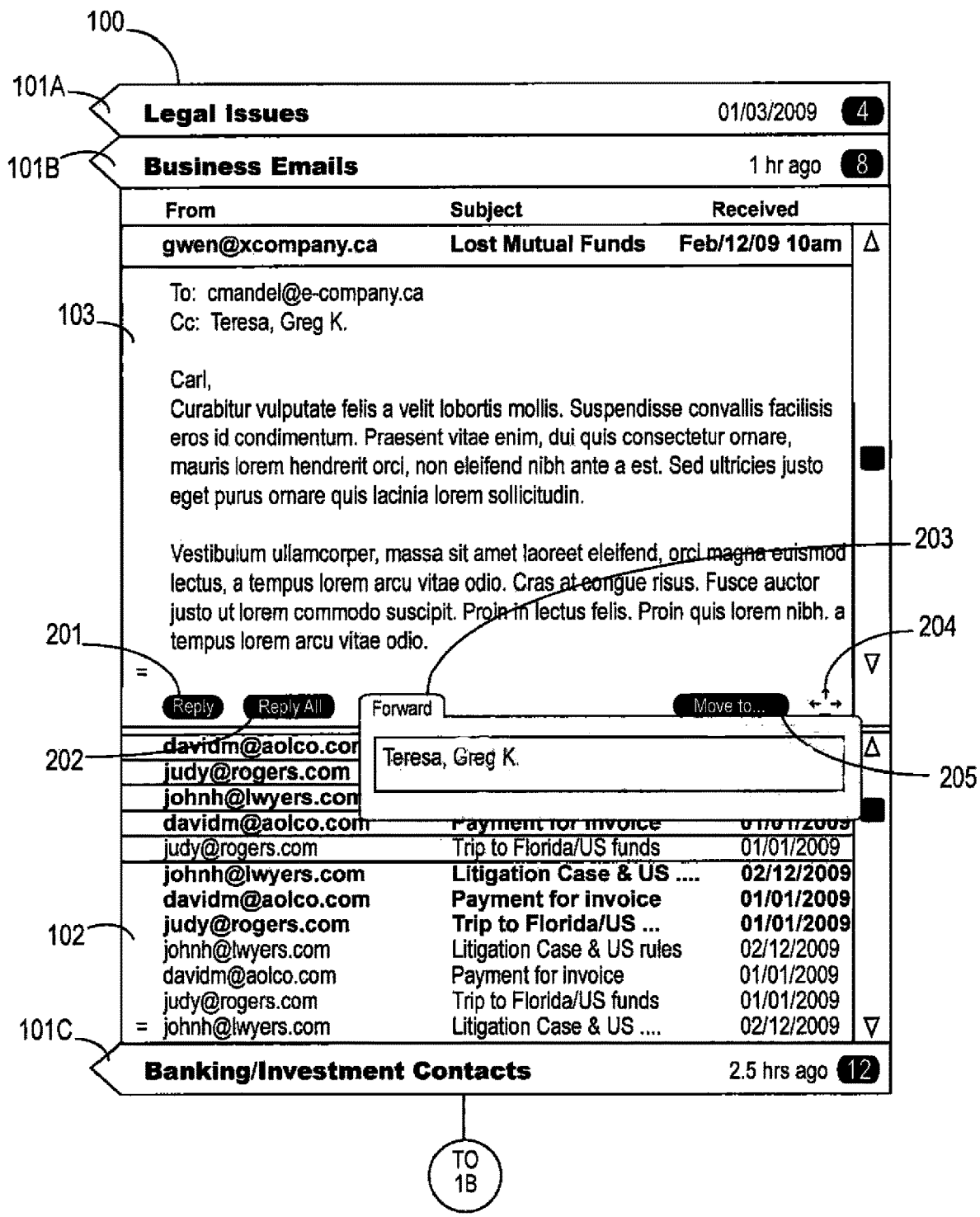

The present system provides a method and process for displaying and sorting messages in a communication system. FIGS. 1A and 1B illustrates a first view of an inbox configuration in one embodiment of the system. In this embodiment, the inbox 100 is defined by a plurality of folders such as folders that represent related emails or other messages or communications. The system allows the user freedom to define and name the folders as desired. In addition, if desired, an email may be represented in more than one folder or it may be constrained to a single folder as desired.

In the example shown, the folders include, by way of example, Legal Issues 101A, Business Emails 101B, Banking/Investment Contacts 101C, Cooper's Classmates 101D, Investment Info/Reports 101E, Friends and Family 101F, and General 101G. In one embodiment, the General folder 101G may be unfiltered so that all emails that are not associated with a defined folder are stored in the General folder. The system also includes a Sent Emails folder that can contain all sent emails from the user of the system. In one embodiment, there may be a separate Sent Emails folder for each of the folders 101A-101G. The system contemplates allowing the user to define rules for sorting and assembling the emails into specific folders. In one embodiment, the system can use a heuristic approach to automatically place emails into an associated folder.

The system presents additional information about each folder. For example, in the right hand area of the header of each folder there is a timestamp representing the time and/or date of the most recent activity in that folder. For updates less than an hour old, the system indicates the number of minutes since the last update, as seen in General folder 101G. If it is between an hour and 24 hours, the system indicates the number of hours since the last update as in folders 101B and 101C. For updates over one day old, the date of the most recent update is provided as in folders 101A and 101D.

In addition, each folder includes a numeric indicator representing the status of messages in the folder. The numeric indicator may represent the number of unread messages in a folder so that the user has an immediate idea of new messages that require
attention. In other embodiments, the numeric indicator can represent the total number of messages in a folder. The presence of new messages may be represented by a darker color of the numeric indicator or by blinking or flashing of the numeric indicator.

In one embodiment, a shadow folder may be provided that houses all unread messages so that the user can easily find new messages without examining each individual folder. In this embodiment, the messages also appear at the same time in each sorted folder, also with an indicator of unread messages, so that the user can use either method of identifying and accessing unread messages. In one embodiment, after a user has read a message in the shadow folder, the message leaves that folder but remains in the proper sorted folder.

One of the advantages of the system is that the multi-folder of FIGS. 1A and 1B can be the principal viewing pane of the email system. This is in contrast to other email clients where the folder view is in a secondary viewing pane. Another advantage of the system illustrated in FIGS. 1A and 1B is the ability to have multiple folders opened at the same time. This is in contrast with the prior art where only one folder can be opened at time.

For example, in FIGS. 1A and 1B, both the Business Emails folder 101B and the Investment Info/Reports folder 101E are open at the same time. When the folders are open, the most recent emails in the folder can be seen and the elevator bar 102 can be used to scroll down to see more messages as desired.

To see one or more individual messages, the user can click on a message in the folder and the message will expand at that location to be visible. In FIGS. 1A and 1B, there is a message 103 open in folder 101B and a message 104 open in folder 101E. (Note that the message itself is scrollable as well as the display portion is not large enough to show the entire message. In prior art systems, typically only one message is displayed at a time.

Figure 7:
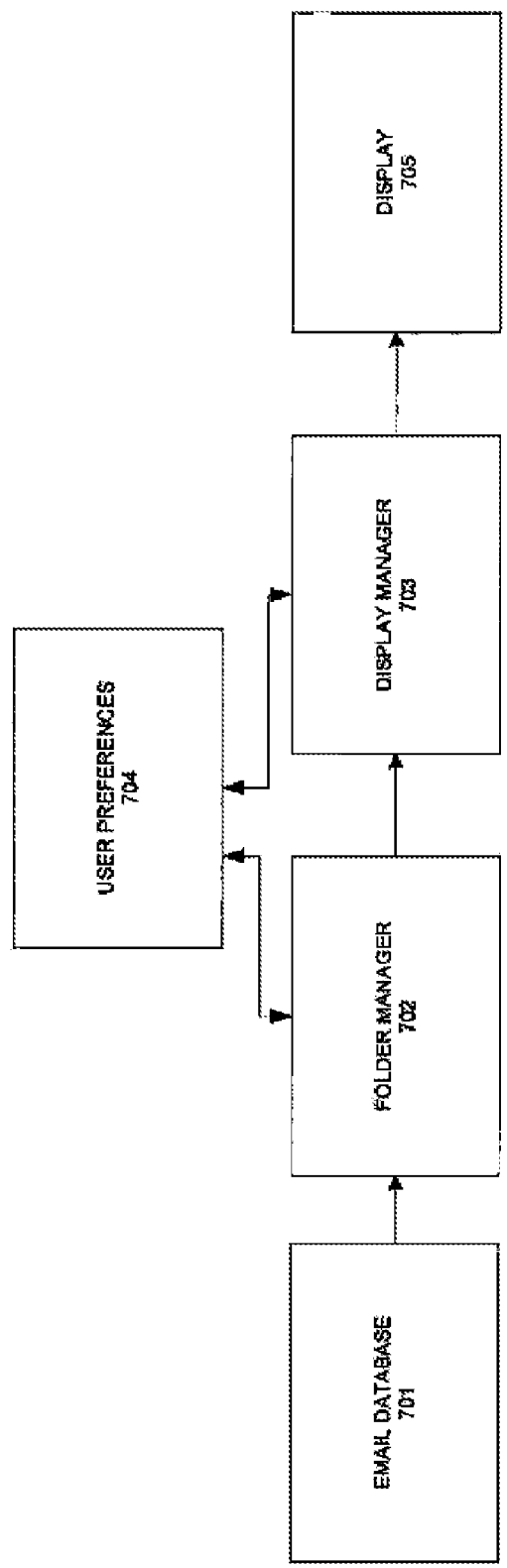
FIG. 7 is a block diagram of an embodiment of the system.

FIG. 7 is a block diagram of a system for implementing an embodiment of the system. An email database 702 stores sent and received emails. A folder manager 702 sorts the emails into the proper folders as determined by user preferences from the
preferences database 704. The folder manager provides the sorted folders to the display manager 703 which assembles a display for the also based on user preferences 704. The assembled information is provided to the display 705.

Figure 2B:
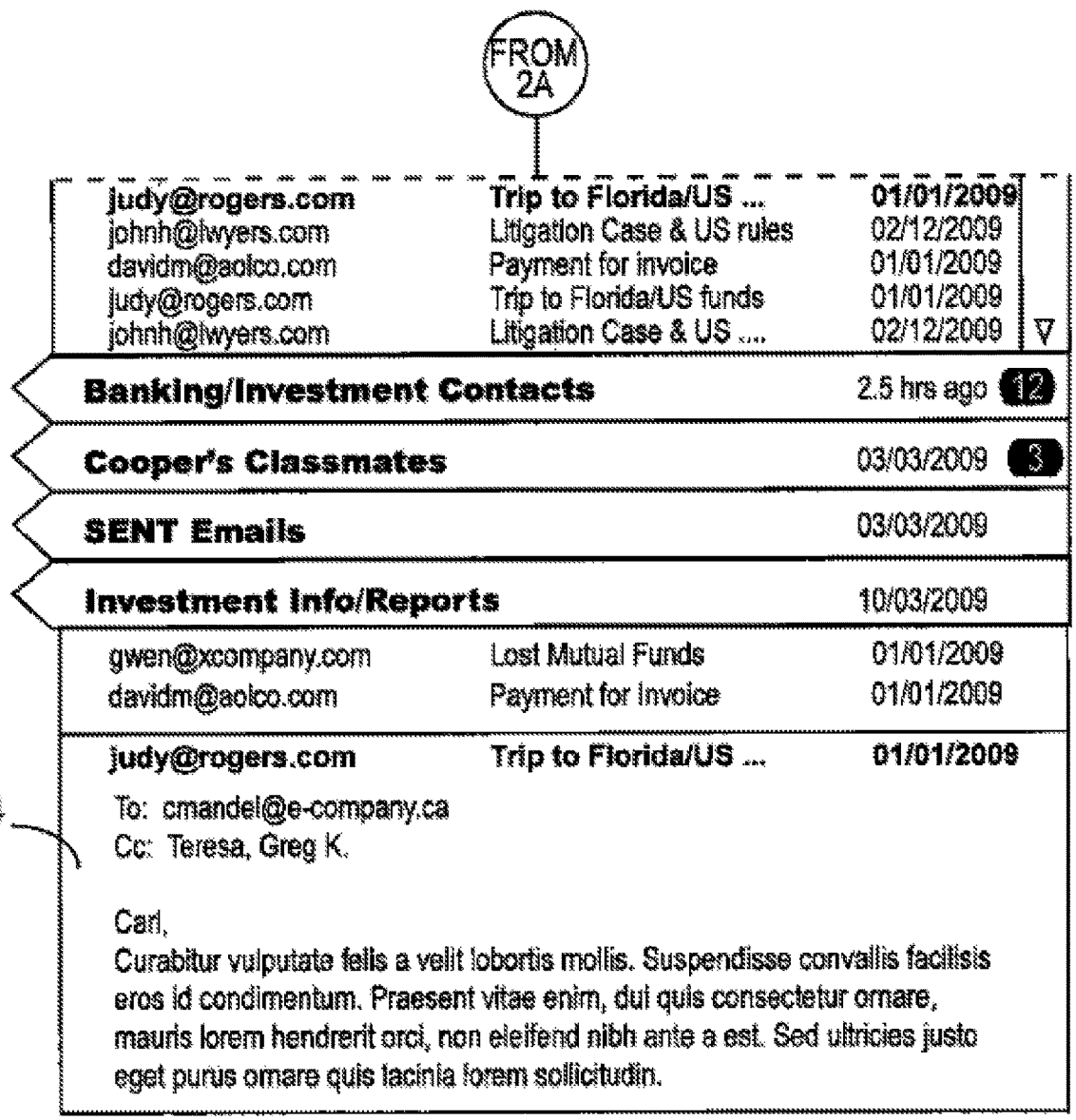

Another useful feature of the system is shown in FIGS. 2A and 2B. When a message is opened, a number of buttons appear that allow manipulation, navigation, and management of the message. For example, message 103 shows buttons 201 (reply), 202 (reply all), 203 (forward), 204 (navigation tool) and 205 (move to). FIGS. 2A and 2B, the user has selected the reply button 201 and a space is created for a reply message 206 immediately above the message 103. This presentation approach differs from the prior art which typically opens a new and separate window for a reply message. Note that even though the user is actively responding to a message, the previously opened messages 103 and 104 remain open.

If the user changes his mind about composing, forwarding, or replying to an email while the pending message 206 is displayed, the user can back out of the operation by clicking anywhere in the potential reply message 206, by using the navigation tool, or by some other close out command. The system also allows the user to interact with text in any of the displayed messages. For example, by clicking the cursor within the text area of displayed message 103 in FIGS. 2A and 2B, the user is able to highlight and copy text as desired. This can occur even when the other messages are open and even when a draft new, reply, or forward message is open. The system removes the modality of prior art system and provides a single interface that allows interaction with all messages as desired.

The system also allows folders to be opened and closed even when a pending forward or reply message is visible. The user is also free to scroll down the page as desired even to the point of hiding a pending message. The pending message will still be visible when scrolling the screen back to that area.

The scrolling can be accomplished via scroll bars or via the navigation tool described in more detail below.

Management Tools

Figure 3:
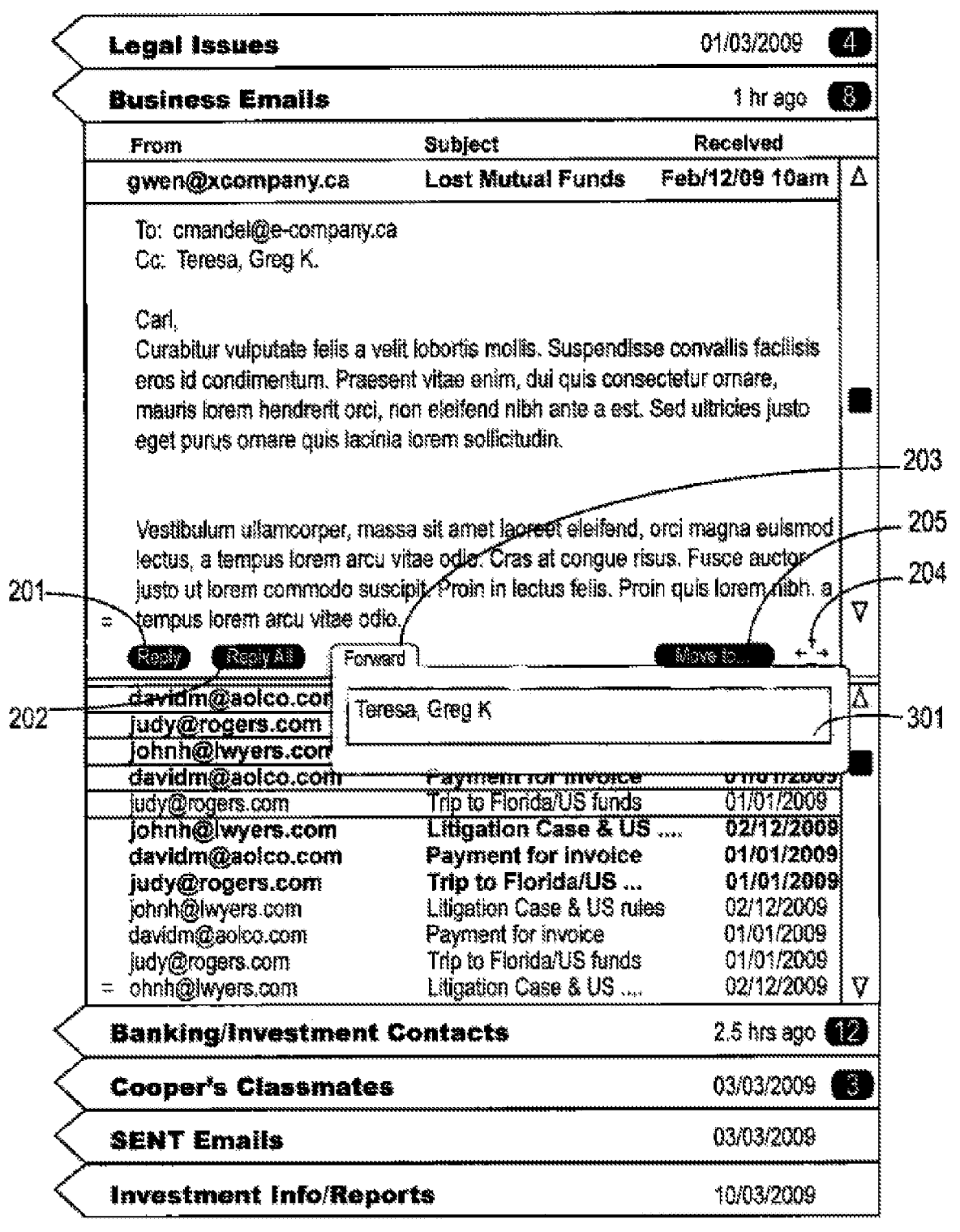

FIG. 3 illustrates management tools in an embodiment of the system. When a message is expanded, a number of management tools appear coincident with the message. The tools are available at each expanded message so that the user need not mouse to the top of the page (although that remains an option) to take action with the expanded message. In one embodiment the management tools include Reply 201, Reply All 202, Forward 203, Move To 205, and trident navigation tool 204. In addition, in one embodiment, the size of an expanded message is substantially consistent such that if the body of the message is of a length that cannot be displayed in that region of space, a scroll bar is automatically provided.

FIG. 3 shows the operation of managing a message. When mousing over one of the management buttons 201-205, an active box (with a cursor) appears that is in the mode of the underlying, button. Here the user has moused over Forward button 203 and box 301 has appeared. The user can begin typing one or more addresses in this box (note that the box has a selectable auto-complete feature if desired). After one or more addresses are entered and the box 301 closed, a message frame appears above the current message so the user can input the body of the user's message in forwarding or replying.

FIGS. 4 and 5 show additional management buttons that appear in a reply (or forwarded) message. The navigation button 204 appears on the new message along with send 401, To 402 (which includes to: cc: and bcc), Save 403 and Attach 404. When mousing over these buttons, active boxes appear that allow the user to enter addresses, choose a save location, find and add attachments, etc.

FIG. 5 illustrates the operation of the To 402 command. When the user mousse over To 402, the system provides an address field that includes to, cc, and bcc options for the user.

FIG. 6 is a view of the navigation button of the system. The navigation button provides new navigational options for the user. The navigation tool in one embodiment typically appears as at 601 and 602. The tool has four directional arrows (up, down, left, right) which can be accessed by clicking on the tool or by using the arrow keys on the keyboard. Clicking on one of the directional arrows will move the user one step where the step depends on where the user is accessing the tool. If the user is at a folder level, a single click on an arrow will move the user to the next folder. If the user is inside a folder and accessing a message, the directional arrows will move from message to message within the folder.

Clicking on the equal sign, or using the equal sign on the keyboard, will toggle the expansion or contraction of a folder or message, depending on where the navigation tool is accessed. When a message or folder is highlighted, the keyboard is active for the navigation tool in the highlighted object.

By clicking the ctrl button on the keyboard, the navigation tool appears as at 603. In this case, the up and down arrows show a number that represents how many steps in the chain each click of an arrow will advance. Within a folder, a click will move the user ten messages up or down for example. The left and right arrows at 604 when the ctrl button is pressed will move the user another screen if the display cannot show the entire inbox at once.

Clicking on the shift key causes the navigation tool to appear as at 605. This mode ties into, for example, a search operation. The user can define a term or terms, and each click of the directional arrows will move the user to the next message that satisfies the search criteria.

Figures 6A, 6B:
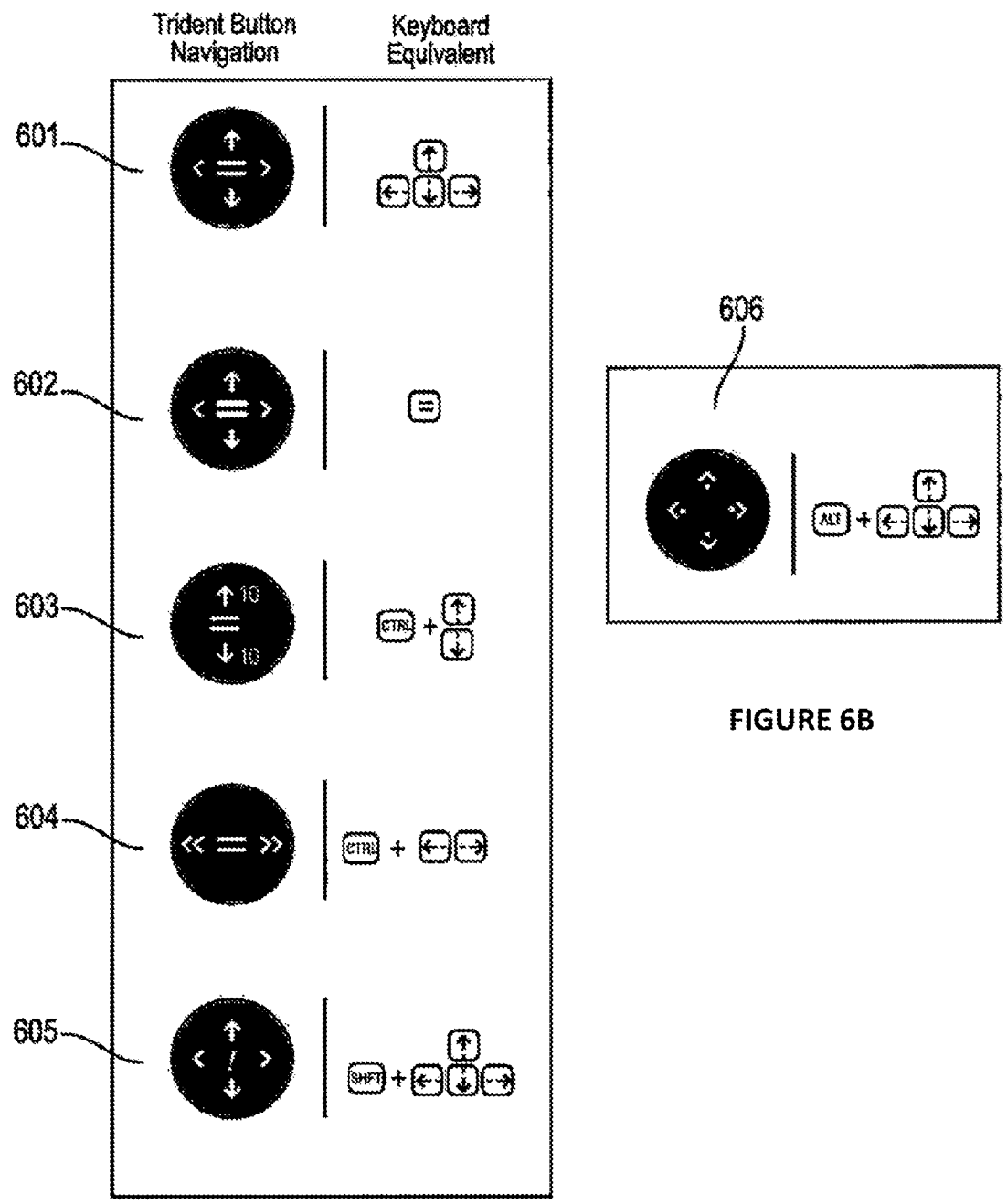
FIGS. 6A and 6B illustrate the navigation button of an embodiment of the system.

FIGS. 6A and 6B illustrate the navigation button of the system. The navigation button provides new navigational options for the user. The navigation tool in one embodiment typically appears as at 601 and 602. The tool has four directional arrows (up, down, left, right) which can be accessed by clicking on the tool or by using the arrow keys on the keyboard. Clicking on one of the directional arrows will move the user one step where the step depends on where the user is accessing the tool. If the user is at a folder level, a single click on an arrow will move the user to the next folder. If the user is inside a folder and accessing a message, the directional arrows will move from message to message within the folder.

Figure 8:
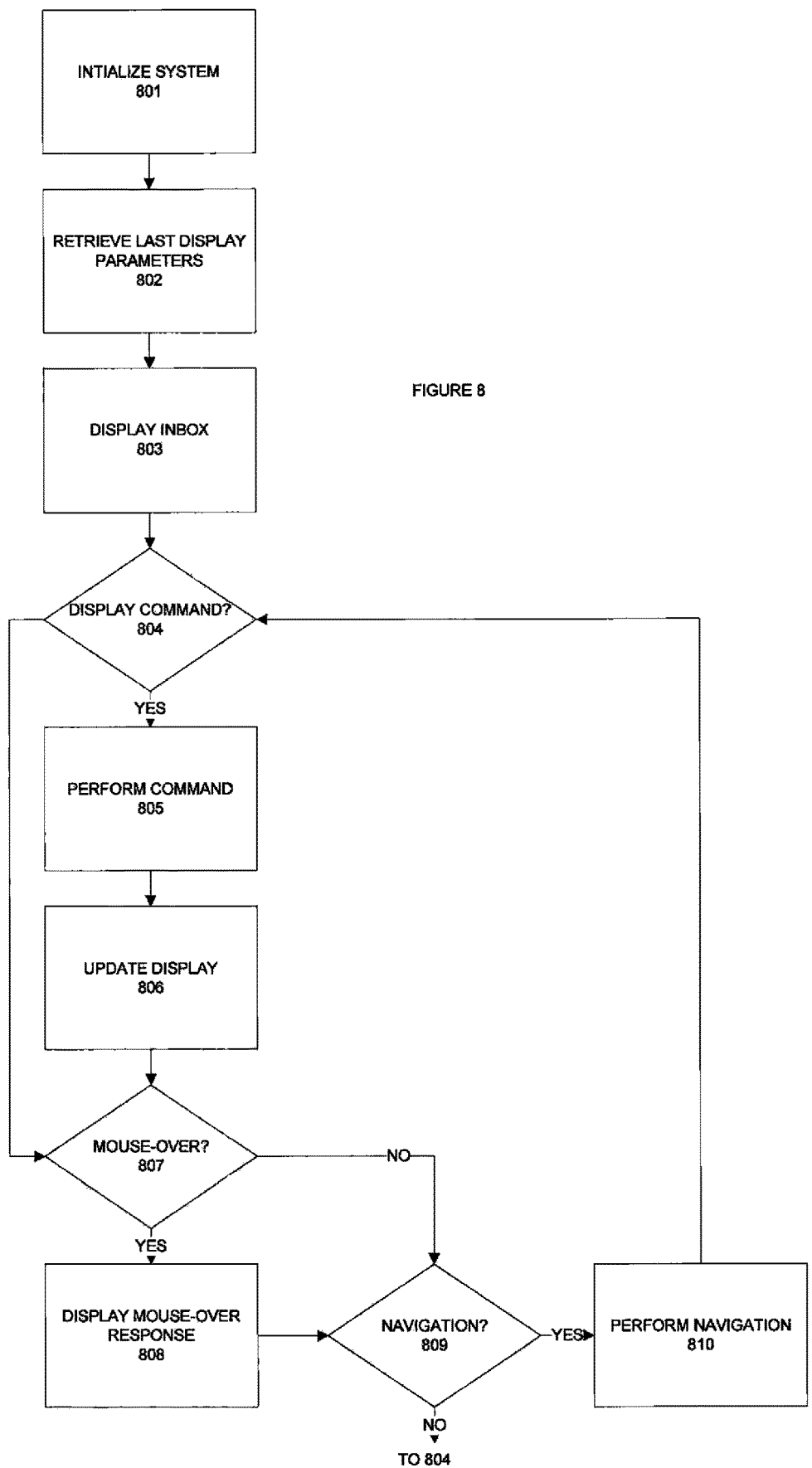
FIG. 8 is a flow diagram of the operation of the system.

FIG. 8 is a flow diagram of the operation of an embodiment of the system. At step 801 the system opens the inbox of the user. At step 802 the system retrieves the status of the inbox the last time that it was opened and uses those parameters to display the inbox at step 803. This means that any folders or messages that were expanded when the system was closed Will be expanded when the inbox is re-opened.

At step 804 the system checks for display change commands from the user. For example, the system checks to see if the user has expanded or contracted folders or messages. If so, the system performs the command at step 805. At step 806 the system updates the display accordingly and adds management tools and navigation tools as appropriate.

If not, the system proceeds to step 807 and checks for mouse-over events. If so, the system responds with the appropriate display at step 808. If not, the system proceeds to step 809 to check for navigation commands. If so, the system performs the command at step 810. If not, the system returns to step 804.

Example Computer System

Figure 9:
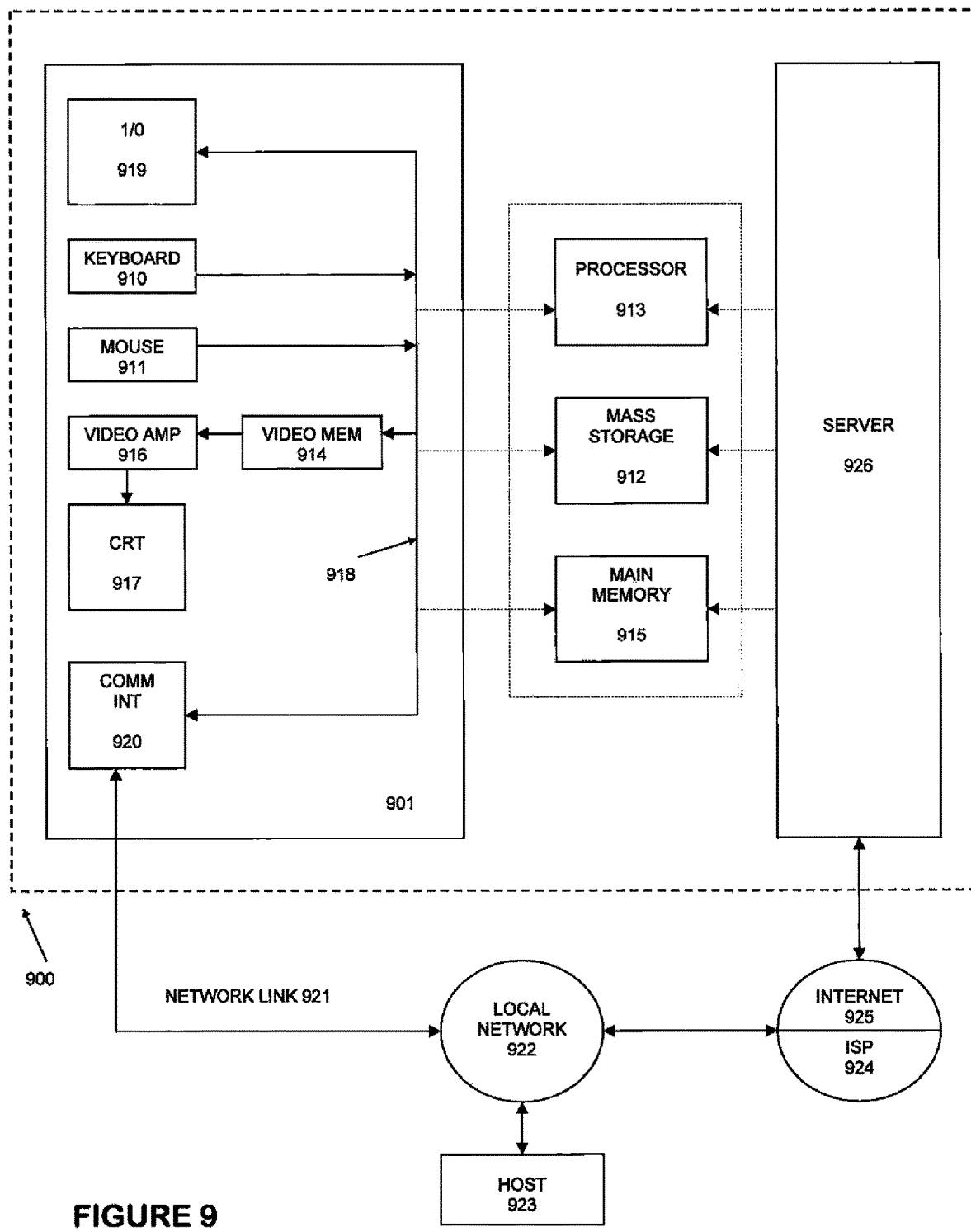
FIG. 9 is an example computer system of an embodiment of the system.

An embodiment of the system can be implemented as computer software in the form of computer readable program code executed in a general purpose computing environment such as environment 900 illustrated in FIG. 9, or in the form of bytecode class files executable within a Java™ run time environment running in such an environment, or in the form of bytecodes running on a processor (or devices enabled to process bytecodes) existing in a distributed environment (e.g., one or more processors on a network). A keyboard 910 and mouse 911 are coupled to a system bus 918. The keyboard and mouse are for introducing user input to the computer system and communicating, that user input to central processing unit (CPU 913. Other suitable input devices may be used in addition to, or in place of, the mouse 911 and keyboard 910, such as a tablet PC, iPad, touchscreen device, smartphone/PDA, etc. I/O (input/output) unit 919 coupled to bi-directional system bus 918 represents such I/O elements as a printer, A/V (audio/video) I/O, etc.

Computer 901 may include a communication interface 920 coupled to bus 918. Communication interface 920 provides a two-way data communication coupling via a network link 921 to a local network 922. For example, if communication interface 920 is an integrated services digital network (ISDN) card or a modem, communication interface 920 provides a data communication connection to the corresponding type of telephone line, which comprises part of network link 921. If communication interface 920 is a local area network (LAN) card, communication interface 920 provides a data communication connection via network link 921 to a compatible LAN. Wireless links are also possible. In any such implementation, communication interface 920 sends and receives electrical, electromagnetic or optical signals which carry digital data streams representing various types of information.

Network link 921 typically provides data communication through one or more networks to other data devices. For example, network link 921 may provide, a connection through local network 922 to local server computer 923 or to data equipment operated by ISP 924. ISP 924 in turn provides data communication services through the world wide packet data communication network now commonly referred to as the "Internet" 925 Local network 922 and Internet 925 both use electrical, electromagnetic or optical signals which carry digital data streams. The signals through the various networks and the signals on network link 921 and through communication interface 920, which carry the digital data to and from computer 900, are exemplary forms of carrier waves transporting the information.

Processor 913 may reside wholly on client computer 901 or wholly on server 926 or processor 913 may have its computational power distributed between computer 901 and server 926. Server 926 symbolically is represented in FIG. 9 as one unit, but server 926 can also be distributed between multiple "tiers". In one embodiment, server 926 comprises a middle and back tier where application logic executes in the middle tier and persistent data is obtained in the back tier. In the case where processor 913 resides wholly on server 926, the results of the computations performed by processor 913 are transmitted to computer 901 via Internet 925, Internet Service Provider (ISP) 924, local network 922 and communication interface 920. In this way, computer 901 is able to display the results of the computation to a user in the form of output.

Computer 901 includes a video memory 914, main memory 915 and mass storage 912, all coupled to bi-directional system bus 918 along with keyboard 910, mouse 911 and processor 913.

As with processor 913, in various computing environments, main memory 915 and mass storage 912, can reside wholly on server 926 or computer 901, or they may be distributed between the two. Examples of systems where processor 913, main memory 915, and mass storage 912 are distributed between computer 901 and server 926 include thin-client computing architectures and other personal digital assistants, Internet ready cellular phones and other Internet computing devices, and in platform independent computing environments.

The mass storage 912 may include both fixed and removable media, such as magnetic, optical or magnetic optical storage systems or any other available mass storage technology. The mass storage may be implemented as a RAID array or any other suitable storage means. Bus 918 may contain, for example, thirty-two address lines for addressing video memory 914 or main memory 915. The system bus 918 also includes, for example, a 32-bit data bus for transferring data between and among the components, such as processor 913, main memory 915, video memory 914 and mass storage 912. Alternatively, multiplex data/address lines may be used instead of separate data and address lines.

In one embodiment of the invention, the processor 913 is a microprocessor such as manufactured by Intel, AMD, Sun, etc. However, any other suitable microprocessor or microcomputer may be utilized. Main memory 915 is comprised of dynamic random access memory (DRAM). Video memory 914 is a dual-ported video random access memory. One port of the video memory 914 is coupled to video amplifier 916. The video amplifier 916 is used to drive the cathode ray tube (CRT) raster monitor 917. Video amplifier 916 is well known in the art and may be implemented by any suitable apparatus. This circuitry converts pixel data stored in video memory 914 to a raster signal suitable for use by monitor 917. Monitor 1917 is a type of monitor suitable for displaying graphic images, such as computer monitor, tablet PC, iPad, smartphone/PDA, touchscreen device, etc Computer 901 can send messages and receive data, including program code, through the network(s), network link 921, and communication interface 920. In the Internet example, remote server computer 926 might transmit a requested code for an application program through Internet 925, ISP 924, local network 922 and communication interface 920. The received code maybe executed by processor 913 as it is received, and/or stored in mass storage 912, or other non-volatile storage for later execution. In this manner, computer 900 may obtain application code in the form of a carrier wave. Alternatively, remote server computer 926 may execute applications using processor 913, and utilize mass storage 912, and/or video memory 915. The results of the execution at server 926 are then transmitted through Internet 925, ISP 924, local network 922 and communication interface 920. In this example, computer 901 performs only input and output functions.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

What is claimed is:

1. A method, comprising:
   sorting a plurality of documents into a plurality of folders according to one or more user-defined rules;
   adding one or more new documents to the plurality of folders according to an automated heuristic approach;
   selecting two or more folders of the plurality of folders;
   selecting a navigation mode according to a key, wherein the navigation mode indicates an automated movement through one or more documents; and
   performing a single operation according to the navigation mode to search, exclusively, all of the documents in the two or more selected folders.

2. The method of claim 1, wherein the method comprises:
   dynamically updating information regarding each folder of the plurality of folders; and
   displaying the information regarding a folder of the plurality of folders.

3. The method of claim 1, wherein the plurality of folders each comprise an indicator that blinks or flashes when the folder contains a new document.

4. The method of claim 1, wherein the plurality of folders each comprise a numeric indicator that displays a time since a folder has been updated.

5. The method of claim 1, wherein the plurality of folders each comprise a numeric indicator that displays a number of new documents.

6. The method of claim 1, wherein each document of the plurality of documents is color coded according to a type of document.

7. The method of claim 1, wherein each document in the plurality of documents comprises a button that is adapted to expand into a window when engaged by a user.

8. The method of claim 7, wherein the window displays information about the document.

9. The method of claim 7, wherein the window allows a user to enter information about the document.

10. The method of claim 1, wherein the method comprises:
    expanding a first document associated with the two or more selected folders to display text associated with the first document; and
    moving from the first document to a second document of the plurality of documents according to the navigation mode and a user-defined criteria,
    wherein:
      the movement in a first mode is up or down based on a user-defined criteria that is independent of a previously executed operation,
      the movement in a second mode is up or down by a predetermined number of documents,
      a selected folder displays one or more folder buttons to allow interaction by a user,
      one of the folder buttons is a navigation tool that includes a plurality of folder sub-buttons,
      one of the folder sub-buttons allows a user to move to and expand another folder,
      the first document and the second document each display one or more document buttons to allow interaction by a user,
      one of the documents buttons is a navigation tool that includes a plurality of document sub-buttons, and
      one of the document sub-buttons allows a user to move to and expand another document.

11. A non-transitory computer-readable medium storing computer-readable instructions, the instructions, when executed by a processor of a terminal device, perform processes comprising:
    sorting a plurality of documents into a plurality of folders according to one or more user-defined rules;

adding one or more new documents to the plurality of folders according to an automated heuristic approach;

selecting two or more folders of the plurality of folders;

selecting a navigation mode according to a key, wherein the navigation mode indicates an automated movement through one or more documents; and performing a single operation according to the navigation mode to search, exclusively, all of the documents in the two or more selected folders.

12. The non-transitory computer-readable medium of claim 11, wherein the processes comprise:

dynamically updating information regarding each folder of the plurality of folders; and displaying the information regarding a folder of the plurality of folders.

13. The non-transitory computer-readable medium of claim 11, wherein the plurality of folders each comprise an indicator that blinks or flashes when the folder contains a new document.

14. The non-transitory computer-readable medium of claim 11, wherein the plurality of folders each comprise a numeric indicator that displays a time since a folder has been updated.

15. The non-transitory computer-readable medium of claim 11, wherein the plurality of folders each comprise a numeric indicator that displays a number of new documents.

16. The non-transitory computer-readable medium of claim 11, wherein each document of the plurality of documents is color coded according to a type of document.

17. The non-transitory computer-readable medium of claim 11, wherein each document in the plurality of documents comprises a button that is adapted to expand into a window when engaged by a user.

18. The non-transitory computer-readable medium of claim 17, wherein the window displays information about the document.

19. The non-transitory computer-readable medium of claim 17, wherein the window allows a user to enter information about the document.

20. The non-transitory computer-readable medium of claim 11, wherein the processes comprise:

expanding a first document associated with the two or more selected folders to display text associated with the first document; and moving from the first document to a second document of the plurality of documents according to the navigation mode and a user-defined criteria, wherein:

the movement in a first mode is up or down based on a user-defined criteria that is independent of a previously executed operation, the movement in a second mode is up or down by a predetermined number of documents, a selected folder displays one or more folder buttons to allow interaction by a user, one of the folder buttons is a navigation tool that includes a plurality of folder sub-buttons, one of the folder sub-buttons allows a user to move to and expand another folder, the first document and the second document each display one or more document buttons to allow interaction by a user, one of the documents buttons is a navigation tool that includes a plurality of document sub-buttons, and one of the document sub-buttons allows a user to move to and expand another document.

* * * * *